US011181891B2

(12) United States Patent
Kooken et al.

(10) Patent No.: US 11,181,891 B2
(45) Date of Patent: Nov. 23, 2021

(54) RELATING WELDING WIRE TO A POWER SOURCE

(71) Applicant: Lincoln Global, Inc., Santa Fe Springs, CA (US)

(72) Inventors: Todd E. Kooken, Solon, OH (US); Joseph A. Daniel, Sagamore Hills, OH (US); Matthew A. Albright, Euclid, OH (US); Bruce John Chantry, Solon, OH (US); Steven R. Peters, Huntsburg, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 564 days.

(21) Appl. No.: 15/696,423

(22) Filed: Sep. 6, 2017

(65) Prior Publication Data

US 2019/0072941 A1 Mar. 7, 2019

(51) Int. Cl.
*G05B 19/418* (2006.01)
*B23K 31/00* (2006.01)
(Continued)

(52) U.S. Cl.
CPC ...... *G05B 19/41865* (2013.01); *B23K 9/1006* (2013.01); *B23K 9/133* (2013.01);
(Continued)

(58) Field of Classification Search
None
See application file for complete search history.

(56) References Cited

U.S. PATENT DOCUMENTS

| 8,686,318 B2 | 4/2014 | Albrecht et al. |
| 9,129,330 B2 | 9/2015 | Albrecht et al. |

(Continued)

FOREIGN PATENT DOCUMENTS

| EP | 2609405 B1 | 1/2015 |
| WO | 2008/031052 A2 | 3/2008 |
| WO | 2016/033568 A1 | 3/2016 |

OTHER PUBLICATIONS

Böhler Welding Drum Solutions; "Wire Volume Systems for Cost-Effective MIG/MAG Welding"; https://www.voestalpine.com/welding/content/download/3629/58368/file/064-2016-EN-GL Ecodrum_WEB.pdf; Accessed Jun. 28, 2017; pp. 1-8.

(Continued)

*Primary Examiner* — Mohammad Ali
*Assistant Examiner* — Saad M Kabir
(74) *Attorney, Agent, or Firm* — David J. Muzilla

(57) ABSTRACT

Embodiments of systems and methods to relate welding wire to a welding power source are disclosed. One embodiment is a networked system having a server computer. The server computer is configured to receive first data including at least one of an identity or a location of a consumable source of welding wire, and at least one of a weight status, indicating a change in weight, or an energization status, indicating an energization state, of the consumable source of welding wire. The server computer is configured to receive second data including at least one of an identity or a location of a welding power source, and an activation status indicating an activation state of the welding power source. The server computer is configured to match the welding power source to the consumable source of welding wire based on at least the first data and the second data.

20 Claims, 5 Drawing Sheets

(51) Int. Cl.
  *B23K 9/10* (2006.01)
  *G05B 19/042* (2006.01)
  *B23K 9/173* (2006.01)
  *B23K 9/133* (2006.01)
  *G06K 7/10* (2006.01)
  *G05B 19/12* (2006.01)

(52) U.S. Cl.
  CPC .............. *B23K 9/173* (2013.01); *B23K 31/00* (2013.01); *G05B 19/0426* (2013.01); *G05B 19/12* (2013.01); *G05B 2219/45135* (2013.01); *G05B 2219/49015* (2013.01); *G06K 7/10297* (2013.01)

(56) References Cited

U.S. PATENT DOCUMENTS

| | | |
|---|---|---|
| 2001/0015381 A1 | 8/2001 | Blankenship et al. |
| 2007/0080153 A1* | 4/2007 | Albrecht ................ B23K 9/10 219/130.01 |
| 2008/0035727 A1 | 2/2008 | Stanzel et al. |
| 2008/0104117 A1 | 5/2008 | Stevens et al. |
| 2011/0114616 A1 | 5/2011 | Albrecht |
| 2012/0241428 A1 | 9/2012 | Kowaleski |
| 2013/0075380 A1 | 3/2013 | Albrech et al. |
| 2013/0112677 A1 | 5/2013 | Christopher et al. |
| 2013/0119036 A1 | 5/2013 | Daniel |
| 2013/0200055 A1 | 8/2013 | Enyedy et al. |
| 2014/0042135 A1 | 2/2014 | Daniel et al. |
| 2014/0048524 A1 | 2/2014 | Ash et al. |
| 2014/0049382 A1 | 2/2014 | Dina et al. |
| 2016/0175972 A1 | 6/2016 | Denis |
| 2016/0318116 A1 | 11/2016 | Daniel |
| 2017/0032281 A1 | 2/2017 | Hsu |
| 2017/0165779 A1 | 6/2017 | Barhorst et al. |

OTHER PUBLICATIONS

Jaselskis, et al.; "RFID's Role in a Fully Integrated, Automated Project Process"; Construction Research Congress 2003; Mar. 19-21, 2003; pp. 1-9.

Liu; "Research on pipe welding information management system based on RFID"; MATEC Web of Conferences 44, 02009; 02009; 2016; pp. 1-4.

Fortissimo; "Simulation of laser-based welding in the automobile and machine tool sectors"; www.fortissimo-project.eu; Accessed Jun. 28, 2017; pp. 1-2.

Lehmhus, et al.; "Cloud-Based Automated Design and Additive Manufacturing: A Usage Data-Enabled Paradigm Shift"; Sensors 2015, 15(12), 32079-322122; pp. 1-41.

St Jerna; "Deployment of Cloud Based Platforms for Process Data Gathering and Visualization in Production Automation"; Tampere University of Technology, Engineering Sciences; Mar. 1, 2017; pp. 1-111.

Extended European Search Report from Corresponding Application No. 18192687.4; dated Feb. 18, 2019; pp. 1-9.

Extended European Search Report from Corresponding Application No. 18192689.0; dated Mar. 25, 2019; pp. 1-9.

* cited by examiner

RELATING WELDING WIRE TO A POWER SOURCE

FIELD

Embodiments of the present invention relate to systems and methods associated with a welding environment. More specifically, embodiments of the present invention relate to systems and methods for relating consumable sources of welding wire to welding power sources in a welding environment.

BACKGROUND

In a welding environment (e.g., in a factory environment where welding is performed), many welding power sources and many consumable sources of welding wire may be located at various locations within the welding environment. At any given time, some welding power sources within the welding environment may or may not be used. Similarly, at any given time, some consumable sources of welding wire within the welding environment may or may not be used. Furthermore, a particular welding power source and a particular consumable source of welding wire, being used together during a welding operation, may or may not be located near each other within the welding environment. This can make it difficult for a manager of the welding environment (or other persons within the welding environment responsible for keeping the welding environment up and running) to determine which welding power source is connected to which consumable source of welding wire, if any. A more effective way of determining and tracking which consumable sources of welding wire are being used by which welding power sources in a welding environment is desired.

SUMMARY

Embodiments of the present invention include systems and methods for relating consumable sources of welding wire to welding power sources in a welding environment (e.g., a factory). A networked configuration of welding power sources, welding wire docking stations, and server computers allow the welding power sources to be properly related to consumable sources of welding wire being used by those welding power sources within a welding environment.

One embodiment includes a method of relating welding wire to a welding power source in a welding environment. The method includes receiving first data associated with a consumable source of welding wire within a welding environment at one or more server computers in a networked system. The first data indicates at least one of an identity or a location of the consumable source of welding wire within the welding environment. The first data also indicates a weight status indicating a change in weight of the consumable source of welding wire within the welding environment. The method further includes receiving second data associated with a welding power source within the welding environment at the one or more server computers in the networked system. The second data indicates at least one of an identity or a location of the welding power source within the welding environment. The second data also indicates an activation status indicating an activation state of the welding power source within the welding environment. The method also includes the one or more server computers in the networked system matching the welding power source to the consumable source of welding wire. The matching is based on at least the first data and the second data and indicates that the welding power source is actively using the consumable source of welding wire during a welding operation within the welding environment. The consumable source of welding wire may include, for example, a drum of welding wire, a box of welding wire, or a spool of welding wire. The networked system may include, for example, at least one of a local area network (LAN), a wide area network (WAN), or a cloud-based network. In one embodiment, the method further comprises generating the weight status, indicating a change in weight of the consumable source of welding wire within the welding environment, via at least a scale of a welding wire docking station loaded with the consumable source of welding wire. In one embodiment, the method includes reading an RFID tag of the consumable source of welding wire, via an RFID reader proximate to the consumable source of welding wire, to extract the identity of the consumable source of welding wire. In one embodiment, the method includes receiving the location of the consumable source of welding wire, as part of the first data, from a welding wire docking station loaded with the consumable source of welding wire. In one embodiment, the method includes reading an RFID tag of the consumable source of welding wire, via an RFID reader proximate to the consumable source of welding wire, to extract characteristics of the consumable source of welding wire. In one embodiment, the method includes receiving the characteristics of the consumable source of welding wire, as part of the first data, at the one or more server computers in the networked system. In accordance with one embodiment, the characteristics of the consumable source of welding wire include at least one of a wire type, a wire size, a lot code, and a wire density.

One embodiment includes a method of relating welding wire to a welding power source in a welding environment. The method includes receiving first data associated with a consumable source of welding wire within a welding environment at one or more server computers in a networked system. The first data indicates at least one of an identity or a location of the consumable source of welding wire within the welding environment. The first data also indicates an energization status indicating an energization state of the consumable source of welding wire within the welding environment. The method also includes receiving second data associated with a welding power source within the welding environment at the one or more server computers in the networked system. The second data indicates at least one of an identity or a location of the welding power source within the welding environment. The second data also indicates an activation status indicating an activation state of the welding power source within the welding environment. The method further includes the one or more server computers in the networked system matching the welding power source to the consumable source of welding wire. The matching is based on at least the first data and the second data and indicates that the welding power source is actively using the consumable source of welding wire during a welding operation within the welding environment. The consumable source of welding wire may include, for example, one of a drum of welding wire, a box of welding wire, or a spool of welding wire. The networked system may include, for example, at least one of a local area network (LAN), a wide area network (WAN), or a cloud-based network. In one embodiment, the method also includes generating the energization status, indicating an energization state of the consumable source of welding wire within the welding environment, via at least one of a magnetic sensor or an electromagnetic sensor proximate to the consumable source of welding wire. In one embodiment, the method includes reading an RFID tag of the consumable source of welding wire, via an RFID reader proximate to the consumable source of welding wire, to extract the identity of the consumable source of welding wire. In one embodiment, the method includes receiving the location of the consumable source of welding wire, as part of the first data, from a welding wire docking station loaded with the consumable source of welding wire. In one embodiment, the method includes reading an RFID tag of the consumable source of welding wire, via an RFID reader proximate to the consumable source of welding wire, to extract characteristics of the consumable source of welding wire. In one embodiment, the method includes receiving the characteristics of the consumable source of welding wire, as part of the first data, at the one or more server computers in the networked system. In accordance with one embodiment, the characteristics of the consumable source of welding wire include at least one of a wire type, a wire size, a lot code, and a wire density.

One embodiment includes a networked system for relating welding wire to a welding power source in a welding environment. The system includes at least one server computer. The at least one server computer is configured to receive first data associated with a consumable source of welding wire within a welding environment. The first data indicates at least one of an identity or a location of the consumable source of welding wire within the welding environment. The first data also indicates at least one of a weight status, indicating a change in weight, or an energization status, indicating an energization state, of the consumable source of welding wire within the welding environment. The at least one server computer is also configured to receive second data associated with a welding power source within the welding environment. The second data indicates at least one of an identity or a location of the welding power source within the welding environment. The second data also indicates an activation status indicating an activation state of the welding power source within the welding environment. The at least one server computer is further configured to match the welding power source to the consumable source of welding wire based on at least the first data and the second data. A match indicates that the welding power source is actively using the consumable source of welding wire during a welding operation within the welding environment. In one embodiment, the networked system also includes a welding wire docking station. The welding wire docking station includes a loading platform configured to accept the consumable source of welding wire. The consumable source of welding wire includes an RFID tag encoded with characteristic information of the consumable source of welding wire. The characteristic information may include at least one of the identity, a wire type, a wire size, a lot code, or a wire density of the consumable source of welding wire, for example. The welding wire docking station also includes an RFID reader configured to read the characteristic information from the RFID tag when the consumable source of welding wire is docked onto the loading platform. The welding wire docking station also includes at least one of a scale and a sensor. The scale is configured to generate the weight status of the consumable source of welding wire when the consumable source of welding wire is docked onto the loading platform. The sensor is configured to generate the energization status, indicating an energization state of the consumable source of welding wire within the welding environment. The welding wire docking station further includes a communication device configured to support communication of the characteristic information and at least one of the weight status or the energization status of the consumable source of welding wire to the at least one server computer as part of the first data.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
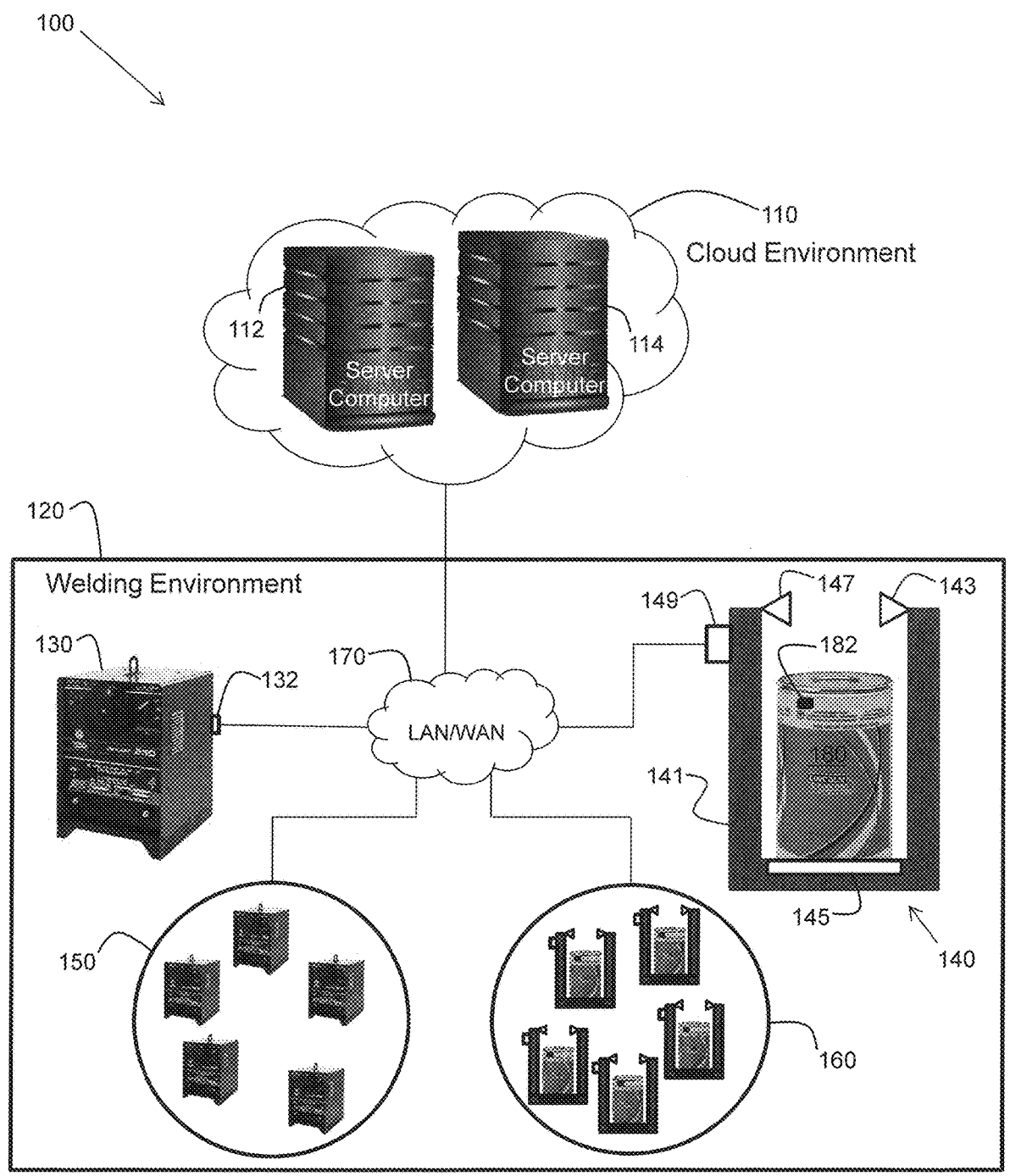
FIG. 1 illustrates a first embodiment of a networked system including a welding environment having stations of welding wire and welding power sources.

Embodiments of systems and methods to identify particular consumable sources of welding wire that are actively being consumed by particular welding power sources in a welding environment are disclosed. In one embodiment, an identity and/or a location of a consumable source of welding wire within the welding environment, along with a weight status of the consumable source of welding wire, are received as first data at a server computer. An identity and/or a location of a welding power source within the welding environment, along with an activation status of the welding power source, are received as second data at the server computer. The server computer analyzes the first data and the second data to determine whether the welding power source is actively using the consumable source of welding wire during a welding operation within the welding environment.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 illustrates a first embodiment of a networked system 100 including a welding environment having stations of welding wire and welding power sources.

Referring to FIG. 1, the networked system 100 includes a cloud environment 110 and a welding environment 120. The cloud environment 110 includes a first server computer 112 and a second server computer 114. For example, the server computers 112 and 114 may exist remotely from the welding environment 120 as part of a server farm and communicate with the welding environment via the internet. The server computers 112 and 114 are configured to receive data from the welding environment 120, process the data, and send other data back to the welding environment, in accordance with one embodiment. In accordance with other embodiments, one, three, or more server computers may exist in the cloud environment 100 which are configured to receive data from the welding environment 120 and send other data back to the welding environment. The server computers have at least one processor configured to execute computer-executable instructions to perform various functions that are described herein.

The welding environment 120 may exist, for example, within a factory or within a portion of a factory. In FIG. 1, the welding environment 120 includes a welding power source 130, a welding wire docking station 140, other welding power sources 150, other welding wire docking stations 160, and a computer network 170 such as, for example, a local area network (LAN), a wide area network (WAN), or some combination thereof. The computer network 170 is configured to provide networked communications between the elements of the welding environment 120 (e.g., between the welding power source 130, the welding wire docking station 140, the other welding power sources 150, and the other welding wire docking stations 160). The computer network 170 is also configured to provide networked communications between the welding environment 120 and the cloud environment 110. It is assumed herein that the welding power sources are configured to be interfaced to, directly or indirectly, other equipment for use during a welding operation. The other equipment may include, for example, welding wire feeders and welding guns or torches.

The welding power source 130 and each of the other welding power sources 150 are configured to communicate with the server computers in the cloud environment 110 via the computer network 170. In one embodiment, each of the welding power sources includes a communication module 132 configured to communicate the information related to the respective welding power source to the server computers 112 and/or 114 in the cloud environment 110 as digital data via the computer network 170. The communicated information may include, for example, an identity and a location of the respective welding power source and an activation status, indicating an activation state of the welding power source, within the welding environment 120. The activation status may be "active" or "inactive", for example, where the "active" status indicates that the welding power source has been activated by a user to apply electrical power to a consumable source of welding wire 180 (e.g., when an arc is initiated when an operator pulls a trigger on a welding gun). The communicated information may also include, for example, a welding mode, a welding voltage, a welding current, a welding duration, and/or a welding wire feed speed. The information, as communicated, may be in the form of digital data, in accordance with one embodiment. Therefore, in one embodiment, the communication device 132 is a digital communication device such as, for example, a router. Communication may be wired (e.g. copper, fiber optic) or wireless (e.g., WiFi, BLUETOOTH®), in accordance with various embodiments.

In one embodiment, the welding wire docking station 140 includes a loading platform 141, an RFID reader 143, a scale 145, a sensor 147, and a communication device 149. As shown in FIG. 1, the loading platform 141 of the welding wire docking station 140 is loaded with a consumable source of welding wire 180 in the form of a drum of welding wire. Alternatively, the welding wire docking station 140 may be loaded with a consumable source of welding wire 180 in the form of a box of welding wire or a spool of welding wire, for example. The wire within the consumable source of welding wire 180 may be fed to the welding power source 130 (or to one of the other welding power sources 150) to be used (consumed) during a welding operation. Similarly, any of the other consumable sources of welding wire loaded on the other welding wire docking stations 160 may be fed to the welding power source 130 or to any of the other welding power sources 150 to be used (consumed) during welding operations.

The loading platform 141 is configured to accept a consumable source of welding wire 180, for example, from a person or a robot on the floor of the welding environment 120. In one embodiment, the consumable source of welding wire 180 includes an RFID tag 182 encoded with characteristic information of the consumable source of welding wire 180. The characteristic information may include, for example, an identity, a wire type, a wire size, a lot code, or a wire density of the consumable source of welding wire 180. In one embodiment, the RFID reader 143 is configured to read the characteristic information from the RFID tag 182 when the consumable source of welding wire 180 is docked with the loading platform 141. The characteristic information, as read, may be in the form of digital data, in accordance with one embodiment.

In one embodiment, the scale 145 is configured to generate a weight status of the consumable source of welding wire 180 as the consumable source of welding wire 180, docked with the loading platform 141, is consumed via a welding power source during a welding operation. In accordance with various embodiments, the weight status indicates a weight or a change in weight of the consumable source of welding wire 180 within the welding environment. The weight status may be in the form of digital data, in accordance with one embodiment.

In one embodiment, the sensor 147 is configured to generate an energization status, indicating an energization state of the consumable source of welding wire 180 when the consumable source of welding wire 180 is docked with the loading platform 141. In accordance with one embodiment, the energization state may be "energized" or "not energized". The energization state indicates that the consumable source of welding wire 180 is being electrically energized by a welding power source within the welding environment. For example, the consumable source of welding wire 180 may be energized by the welding power source 130 during a welding operation when the welding power source is activated ("active" status) and as the welding wire is fed by a wire feeder toward a workpiece (e.g., when the welding wire is connected to an activated welding power source). The energization status may be in the form of digital data, in accordance with one embodiment.

The sensor 147 may be, for example, a magnetic sensor or an electromagnetic sensor, in accordance with various embodiments, configured to detect magnetic or electromagnetic fields given off by the consumable source of welding wire when energized. In accordance with another embodiment, the sensor 147 may be configured to read a coded signal transmitted by the welding power source on the wire of the consumable source of welding wire when the welding power source is activated. The coded signal indicates, for example, energization of the consumable source of welding wire.

In one embodiment, the communication device 149 is configured to communicate the characteristic information of the consumable source of welding wire 180, along with the weight status and/or the energization status of the consumable source of welding wire 180, to the server computers 112 and/or 114 in the cloud environment 110 as digital data via the computer network 170. The location of the welding wire docking station 140 within the welding environment may also be communicated (thus indicating the location of the consumable source of welding wire 180). For example, data indicating the location of the welding wire docking station 140 may be stored in a memory of the communication device 149, in accordance with one embodiment. In one embodiment, the communication device 149 is a digital communication device such as, for example, a router. Communication may be wired (e.g. copper, fiber optic) or wireless (e.g., WiFi, BLUETOOTH®), in accordance with various embodiments.

The digital data from the consumable source of welding wire 180 and docking station 140 (or from the other consumable sources of welding wire and docking stations 160) to the server computers 112 and/or 114 may be considered to be "first data". Therefore, the first data represents an identity and/or a location of a consumable source(s) of welding wire as well as a weight status and/or an energization status of the consumable source(s) of welding wire. The digital data from the welding power source 130 (or from the other welding power sources 150) to the server computers 112 and/or 114 may be considered to be "second data". Therefore, the second data represents an identity and/or a location of a welding power source(s) as well as an activation status of the welding power source(s). The second data may also include representations of a welding voltage, a welding current, a welding mode, and/or a wire feed speed associated with the welding power source(s).

The server computers 112 and/or 114 in the cloud environment 110, having received the first data and the second data from the welding environment 120 (e.g., over the internet), are configured to (i.e., include logic/intelligence to) correlate or match a welding power source to a consumable source of welding wire based on the first data and the second data. Such matching indicates that a particular welding power source is actively using a particular consumable source of welding wire during a welding operation within the welding environment. That is, the matching indicates from which particular consumable source of welding wire in the welding environment a particular welding power source is drawing wire (e.g., via a wire feeder).

In this manner, any welding power source can be matched to any consumable source of welding wire being used by the welding power source in the welding environment. That is, a welding environment having multiple welding power sources and multiple consumable sources of welding wire on docking stations can report to the cloud environment 110 and the cloud environment can discern which welding power sources are using which consumable sources of welding wire. In one embodiment, the cloud environment records and tracks all associated information for quality purposes. No human intervention is used to make any matches, associations, or correlations.

The various portions of the first data (identity, location, weight status, energization status) may be time stamped, in accordance with one embodiment. Similarly, the various portions of the second data (identity, location, activation status, welding voltage, welding current, welding mode, wire feed speed) may be time stamped, in accordance with one embodiment. The time stamps help the server computers with the matching process. For example, if the first data indicates that a consumable source of welding wire 180 was energized at a first time, and the second data indicates that a welding power source 130 was activated at a second time which is within a few milliseconds of the first time, then it is likely that the welding power source 130 is using the consumable source of welding wire 180. Such a match may be verified by confirming that the weight status for the consumable source of welding wire 180 is now indicating a reduction in weight over time (i.e., as the welding wire is being consumed during a welding operation), whereas just previously the weight was unchanging. Furthermore, by knowing the wire feed speed associated with a welding power source that is matched to a consumable source of welding wire, a length of welding wire used over a period of time may be determined.

By knowing which welding power sources are using which consumable sources of welding wire within the welding environment, various operational statistics can be tracked by the server computers and various decisions can be made with respect to managing the welding environment. For example, in one embodiment, the server computers are able to estimate when a welding wire docking station is likely to run out of welding wire based on a current weight of the corresponding consumable source of welding wire and a rate of change of the weight. Using such information, a manager of the welding environment (or the server computers themselves) can order a replacement consumable source of welding wire to be moved to the corresponding welding wire docking station. Other estimations, determinations, and decisions can also be made based on knowing which welding power sources are matched to which consumable sources of welding wire within a welding environment, in accordance with various embodiments.

Figure 2:
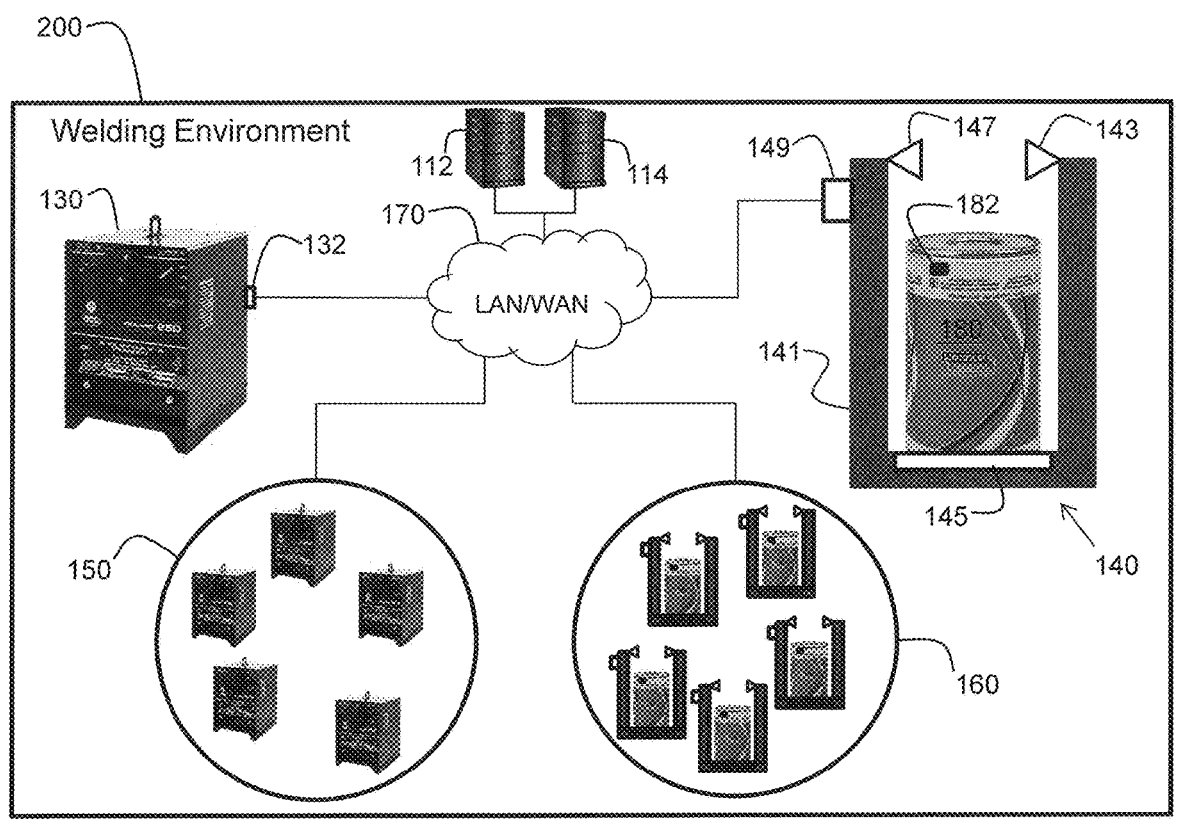
FIG. 2 illustrates a second embodiment of a networked system including a welding environment having stations of welding wire and welding power sources.

FIG. 2 illustrates a second embodiment of a networked system 200 including a welding environment having stations of welding wire and welding power sources. The networked system 200 of FIG. 2 is similar to the networked system 100 of FIG. 1 except that the networked system 200 is entirely within the welding environment. The server computers 112 and 114 are no longer in a cloud environment but, instead, are part of the welding environment. Such a networked system 200 may be desirable, for example, when the cost associated with paying for resources in a cloud environment are too high over time, or when internet access is unavailable or unreliable. However, the functionality of collecting data and matching welding power sources to consumable sources of welding wire may be essentially the same for both the networked system 100 of FIG. 1 and the networked system 200 of FIG. 2. Furthermore, even though the term "server computer" is used herein, with respect to FIG. 2, other types of equivalent computers (which are not technically server computers) may be used instead to perform the associated functions described herein, in accordance with various other embodiments.

Figure 3:
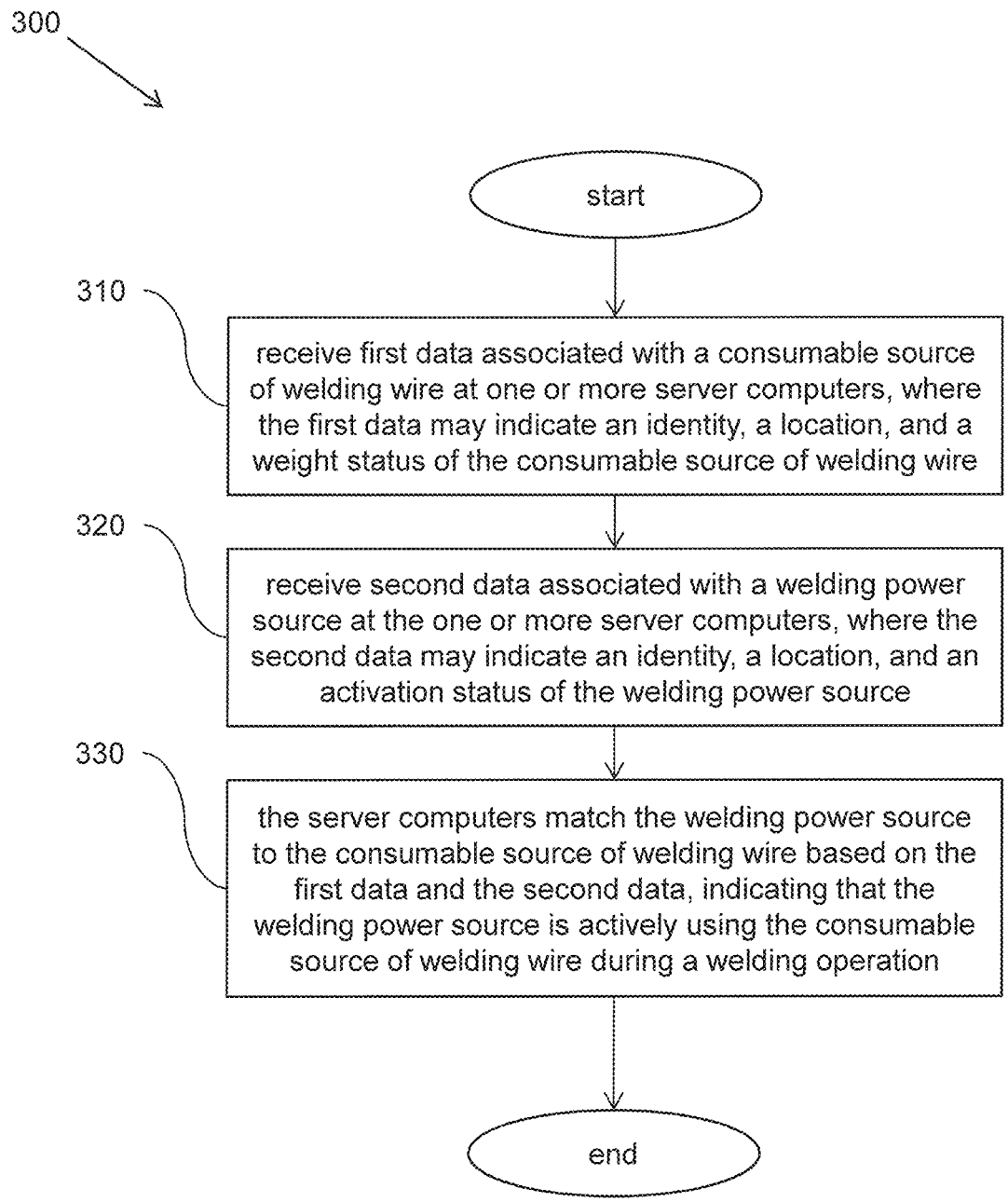
FIG. 3 illustrates a flowchart of a first embodiment of a method of relating welding wire to a welding power source in a welding environment.

FIG. 3 illustrates a flowchart of a first embodiment of a method 300 of relating welding wire to a welding power source in a welding environment. At block 310, one or more server computers receive first data associated with a consumable source of welding wire in the welding environment. The first data may indicate an identity, a location, and a weight status of the consumable source of welding wire. In one embodiment, the weight status indicates a change in weight of the consumable source of welding wire within the welding environment. In other embodiments, the weight status may indicate an absolute weight (e.g., 476 lbs.) or a relative weight (e.g., 78% of maximum) of the consumable source of welding wire within the welding environment.

At block 320, the one or more server computers receive second data associated with a welding power source. The second data may indicate an identity, a location, and an activation status of the welding power source. The activation status indicates an activation state (e.g., active or not active) of the welding power source within the welding environment. At block 330, the server computers match the welding power source to the consumable source of welding wire based on the first data and the second data. The match indicates that the welding power source is actively using the consumable source of welding wire during a welding operation. The method 300 may be performed by one or more of the server computers in the cloud environment of FIG. 1 or in the welding environment of FIG. 2, for example.

Figure 4:
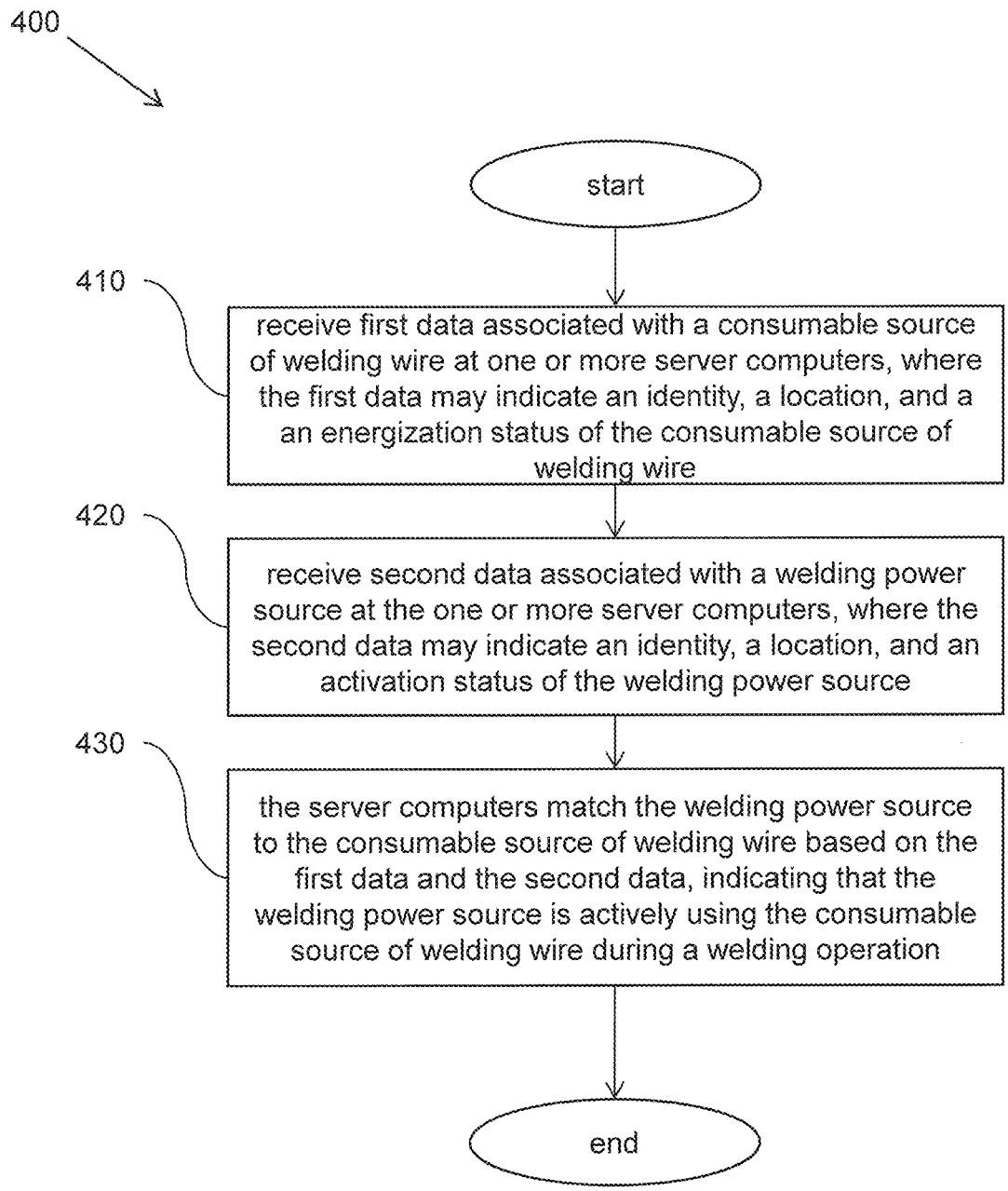
FIG. 4 illustrates a flowchart of a second embodiment of a method of relating welding wire to a welding power source in a welding environment.

FIG. 4 illustrates a flowchart of a second embodiment of a method 400 of relating welding wire to a welding power source in a welding environment. At block 410, one or more server computers receive first data associated with a consumable source of welding wire in the welding environment. The first data may indicate an identity, a location, and an energization status of the consumable source of welding wire. In one embodiment, the energization status indicates an energization state (e.g., energized or not energized) of the consumable source of welding wire within the welding environment.

At block 420, the one or more server computers receive second data associated with a welding power source. The second data may indicate an identity, a location, and an activation status of the welding power source. The activation status indicates an activation state (e.g., active or not active) of the welding power source within the welding environment. At block 430, the server computers match the welding power source to the consumable source of welding wire based on the first data and the second data. The match indicates that the welding power source is actively using the consumable source of welding wire during a welding operation. The method 400 may be performed by one or more of the server computers in the cloud environment of FIG. 1 or in the welding environment of FIG. 2, for example.

As an example, a server computer operating on the first data and the second data may determine that an energization status of a consumable source of welding wire in the welding environment was changed from "not energized" to "energized" at practically the same time that an activation status of a welding power source in the welding environment changed from "non-active" to "active". Such a determination may be indicative of a match, indicating that the welding power source is actively using the consumable source of welding wire during a welding operation. In accordance with one embodiment, the match may be confirmed by checking a time-stamped weight status, if available, of the consumable source of welding wire.

As another example, a server computer operating on the first data and the second data may determine that a weight status of a consumable source of welding wire in the welding environment began indicating a change in weight at practically the same time that an activation status of a welding power source in the welding environment changed from "non-active" to "active". Such a determination may be indicative of a match, indicating that the welding power source is actively using the consumable source of welding wire during a welding operation. In accordance with one embodiment, the match may be confirmed by checking a time-stamped energization status, if available, of the consumable source of welding wire.

Figure 5:
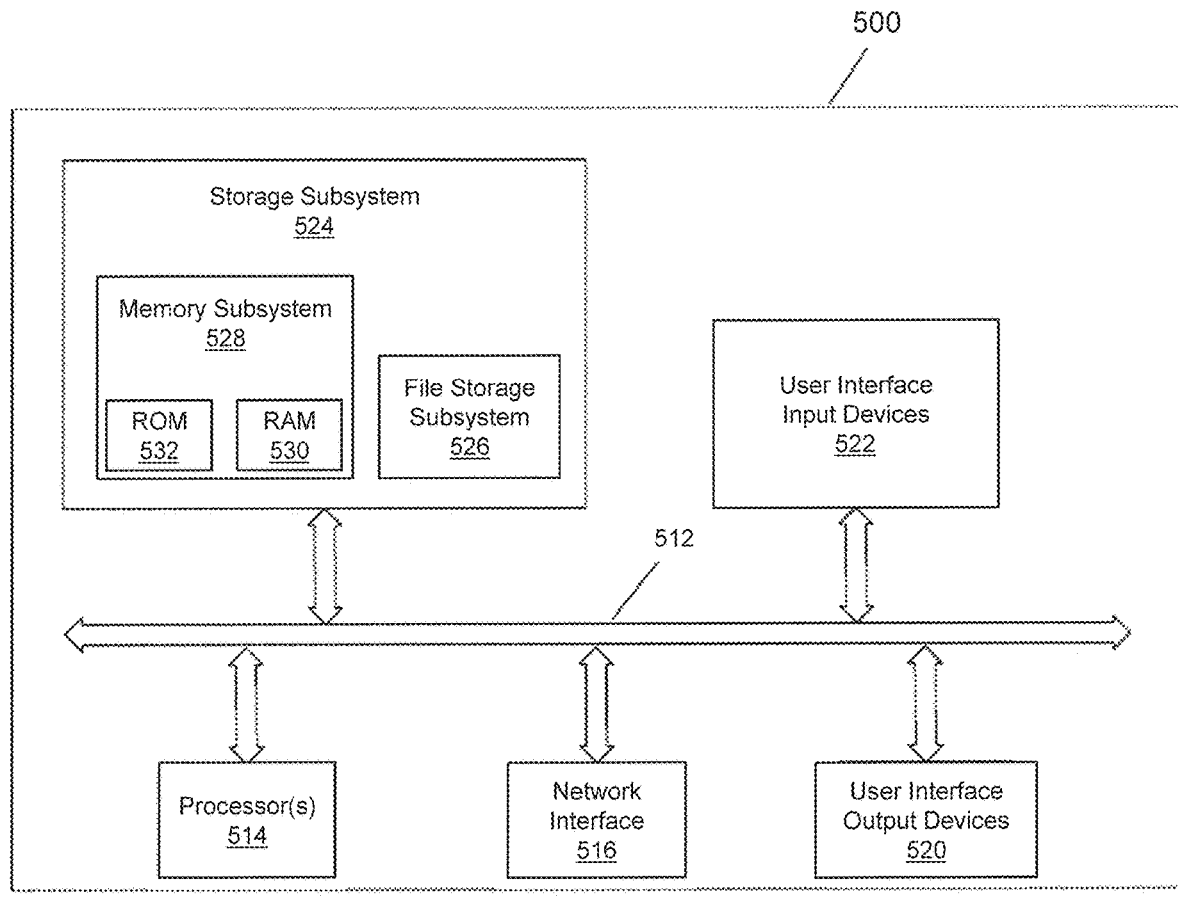
FIG. 5 illustrates one embodiment of an example server computer that may be used as the server computers in the networked system of FIG. 1 or in the networked system of FIG. 2.

FIG. 5 illustrates an embodiment of an example server computer 500 that may be used as the server computer 112 and/or 114 in the networked system 100 of FIG. 1, or in the networked system 200 of FIG. 2. The server computer 500 includes at least one processor 514 which communicates with a number of peripheral devices via bus subsystem 512. These peripheral devices may include a storage subsystem 524, including, for example, a memory subsystem 528 and a file storage subsystem 526, user interface input devices 522, user interface output devices 520, and a network interface subsystem 516. The input and output devices allow user interaction with the server computer 500. Network interface subsystem 516 provides an interface to outside networks and is coupled to corresponding interface devices in other computer systems. For example, the welding power source 130 of the networked system 100 may share one or more characteristics with the server computer 500 and may include, for example, elements of a conventional computer, a digital signal processor, and/or other computing device.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the server computer 500 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the server computer 500 to the user or to another machine or computer system.

Storage subsystem 524 stores programming and data constructs that provide some or all of the server computer functionality described herein. For example, the storage subsystem 524 may include one or more software modules including computer executable instructions for matching a welding power source to a consumable source of welding wire.

These software modules are generally executed by processor 514 alone or in combination with other processors. Memory subsystem 528 used in the storage subsystem can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 526 in the storage subsystem 524, or in other machines accessible by the processor(s) 514.

Bus subsystem 512 provides a mechanism for letting the various components and subsystems of the server computer 500 communicate with each other as intended. Although bus subsystem 512 is shown schematically as a single bus, alternative embodiments of the bus subsystem may use multiple buses.

The server computer 500 can be of various implementations including a single conventional server computer, a single workstation, a part of a computing cluster, a blade server, a part of a server farm, or any other data processing system or computing device configured to perform the server computer functions described herein. Due to the ever-changing nature of computing devices and networks, the description of the server computer 500 depicted in FIG. 5 is intended only as a specific example for purposes of illustrating some embodiments. Many other configurations of the server computer 500 are possible having more or fewer components than the server computer depicted in FIG. 5.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. A method of relating wire to a power source in a factory environment, the method comprising:
   receiving first time stamped data associated with a consumable source of wire within a factory environment at one or more server computers in a networked system, wherein the first time stamped data indicates:
   at least one of an identity or a location of the consumable source of wire within the factory environment, and
   a weight status, stamped with a first time, indicating a change in weight of the consumable source of wire within the factory environment;
   receiving second time stamped data associated with a power source within the factory environment at the one or more server computers in the networked system, wherein the second time stamped data indicates:
   at least one of an identity or a location of the power source within the factory environment, and
   an activation status, stamped with a second time, indicating an activation of the power source within the factory environment; and
   the one or more server computers in the networked system matching the power source to the consumable source of wire based on at least the first time stamped data, the first time, the second time stamped data, and the second time, wherein the matching indicates that the power source is actively using the consumable source of wire during an operation within the factory environment.

2. The method of claim 1, wherein the consumable source of wire includes one of a drum of welding wire, a box of welding wire, or a spool of welding wire.

3. The method of claim 1, wherein the networked system includes at least one of a local area network (LAN), a wide area network (WAN), or a cloud-based network.

4. The method of claim 1, further comprising generating the weight status, indicating a change in weight of the consumable source of wire within the factory environment, via at least a scale of a wire docking station loaded with the consumable source of wire.

5. The method of claim 1, further comprising reading an RFID tag of the consumable source of wire, via an RFID reader proximate to the consumable source of wire, to extract the identity of the consumable source of wire.

6. The method of claim 1, further comprising receiving the location of the consumable source of wire at the one or more server computers, as part of the first time stamped data, from a wire docking station loaded with the consumable source of wire.

7. The method of claim 1, further comprising reading an RFID tag of the consumable source of wire, via an RFID reader proximate to the consumable source of wire, to extract characteristics of the consumable source of wire.

8. The method of claim 7, further comprising receiving the characteristics of the consumable source of wire, as part of the first time stamped data, at the one or more server computers in the networked system.

9. The method of claim 8, wherein the characteristics of the consumable source of wire include at least one of a wire type, a wire size, a lot code, and a wire density.

10. A method of relating wire to a power source in a factory environment, the method comprising:
    receiving first time stamped data associated with a consumable source of wire within a factory environment at one or more server computers in a networked system, wherein the first time stamped data indicates:
    at least one of an identity or a location of the consumable source of wire within the factory environment, and
    an energization status, stamped with a first time, indicating an energization state of the consumable source of wire within the factory environment;
    receiving second time stamped data associated with a power source within the factory environment at the one or more server computers in the networked system, wherein the second time stamped data indicates:
    at least one of an identity or a location of the power source within the factory environment, and
    an activation status, stamped with a second time, indicating an activation state of the power source within the factory environment; and
    the one or more server computers in the networked system matching the power source to the consumable source of wire based on at least the first time stamped data, the first time, the second time stamped data, and the second time, wherein the matching indicates that the power source is actively using the consumable source of wire during an operation within the factory environment.

11. The method of claim 10, wherein the consumable source of wire includes one of a drum of welding wire, a box of welding wire, or a spool of welding wire.

12. The method of claim 10, wherein the networked system includes at least one of a local area network (LAN), a wide area network (WAN), or a cloud-based network.

13. The method of claim 10, further comprising generating the energization status, indicating an energization state of the consumable source of wire within the factory environment, via at least one of a magnetic sensor or an electromagnetic sensor proximate to the consumable source of wire.

14. The method of claim 10, further comprising reading an RFID tag of the consumable source of wire, via an RFID reader proximate to the consumable source of wire, to extract the identity of the consumable source of wire.

15. The method of claim 10, further comprising receiving the location of the consumable source of wire at the one or more server computers, as part of the first time stamped data, from a wire docking station loaded with the consumable source of wire.

16. The method of claim 10, further comprising reading an RFID tag of the consumable source of wire, via an RFID reader proximate to the consumable source of wire, to extract characteristics of the consumable source of wire.

17. The method of claim 16, further comprising receiving the characteristics of the consumable source of wire, as part of the first time stamped data, at the one or more server computers in the networked system.

18. The method of claim 17, wherein the characteristics of the consumable source of wire include at least one of a wire type, a wire size, a lot code, and a wire density.

19. A networked system for relating wire to a power source in a factory environment, the networked system comprising:
at least one server computer configured to:
receive first time stamped data associated with a consumable source of wire within a factory environment, wherein the first time stamped data indicates:
at least one of an identity or a location of the consumable source of wire within the factory environment, and
at least one of a weight status, stamped with a first time, indicating a change in weight, or an energization status, stamped with a second time, indicating an energization state, of the consumable source of wire within the factory environment;
receive second time stamped data associated with a power source within the factory environment, wherein the second time stamped data indicates:
at least one of an identity or a location of the power source within the factory environment, and
an activation status, stamped with a third time, indicating an activation of the power source within the factory environment; and
match the power source to the consumable source of wire based on at least the first time stamped data, at least one of the first time and the second time, the second time stamped data, and the third time, indicating that the power source is actively using the consumable source of wire during an operation within the factory environment.

20. The networked system of claim 19, further comprising a wire docking station, wherein the wire docking station includes:
a loading platform configured to accept the consumable source of wire, wherein the consumable source of wire includes an RFID tag encoded with characteristic information of the consumable source of wire, and wherein the characteristic information includes at least one of the identity, a wire type, a wire size, a lot code, or a wire density of the consumable source of wire;
an RFID reader configured to read the characteristic information from the RFID tag when the consumable source of wire is docked with the loading platform;
at least one of:
a scale configured to generate the weight status of the consumable source of wire as the consumable source of wire docked with the loading platform is consumed, or
a sensor configured to generate the energization status, indicating an energization state of the consumable source of wire, when the consumable source of wire is docked with the loading platform; and
a communication device configured to support communication of the characteristic information and at least one of the weight status or the energization status of the consumable source of wire to the at least one server computer as part of the first time stamped data.

* * * * *